United States Patent
Jeong et al.

(10) Patent No.: US 8,753,701 B2
(45) Date of Patent: Jun. 17, 2014

(54) PREMIX COMPOSITION OF GLUTINOUS RICE CAKE FOR BAKING IN MICROWAVE OVEN AND A PREPARATION METHOD THEREOF

(75) Inventors: Hyo-Young Jeong, Seoul (KR); Yoon-Seok Choi, Seoul (KR); Chang-Yong Lee, Seoul (KR); Jun-Bong Choi, Seoul (KR)

(73) Assignee: CJ Cheiljedang Corp., Seoul (KR)

( * ) Notice: Subject to any disclaimer, the term of this patent is extended or adjusted under 35 U.S.C. 154(b) by 0 days.

(21) Appl. No.: 12/739,811

(22) PCT Filed: Oct. 24, 2008

(86) PCT No.: PCT/KR2008/006288
§ 371 (c)(1),
(2), (4) Date: Jun. 21, 2010

(87) PCT Pub. No.: WO2009/054691
PCT Pub. Date: Apr. 30, 2009

(65) Prior Publication Data
US 2010/0255161 A1    Oct. 7, 2010

(30) Foreign Application Priority Data
Oct. 26, 2007 (KR) .......................... 10-2007-0108550

(51) Int. Cl.
*A21D 13/00* (2006.01)
*A21D 2/00* (2006.01)

(52) U.S. Cl.
USPC ............................. 426/243; 426/549; 426/622

(58) Field of Classification Search
None
See application file for complete search history.

(56) References Cited

FOREIGN PATENT DOCUMENTS

| JP | 52120144 | A | * | 10/1977 |
| JP | 58071850 | A | * | 4/1983 |
| JP | 60153768 | A | * | 8/1985 |
| KR | 2000050623 | A | * | 8/2000 |
| KR | 2003023658 | A | * | 3/2003 |
| KR | 2006024118 | A | * | 3/2006 |
| KR | 2007007652 | A | * | 1/2007 |
| WO | WO 2005092118 | A1 | * | 10/2005 |

OTHER PUBLICATIONS

"Rice Flour Characterization and Utilization" in Asian Foods: Science and Technology (Google eBook) edited by Catharina Y.W. Ang, Keshun Ju, Yao-Wen Huang, CRC press Apr. 5, 1999; pp. 12-13. http://books.google.com; accessed on Aug. 9, 2012.*
Zhao Wei. "A study on Rice-cake's makiing formula" Food Research and Development (abstract) May 18, 2007 http://en.cnki.com DOI: CNKI:ISSN:1005-6521.0.2007-05-018, accessed Jul. 24, 2013 (Google Scholar).*

* cited by examiner

*Primary Examiner* — Humera Sheikh
*Assistant Examiner* — Subbalakshmi Prakash
(74) *Attorney, Agent, or Firm* — Birch, Stewart, Kolasch & Birch, LLP

(57) ABSTRACT

The present invention relates to a premix composition of glutinous rice cake for baking in microwave oven and a preparation method thereof, the present invention have effect on providing premix composition of glutinous rice cake which have a good shape retainability after heating and to maintain softness for 24 hours without adding inhibitor of aging and to distribute for above 6 months at room temperature with glutinous rice of water content of below 15% by using glutinous rice powder having 200 to 400 μm of average grain size and comprising less than 5 wt % of glutinous rice powder of below 200 mesh and 40 to 70 wt % of glutinous rice powder of 200 to 400 mesh.

5 Claims, 2 Drawing Sheets

US 8,753,701 B2

PREMIX COMPOSITION OF GLUTINOUS RICE CAKE FOR BAKING IN MICROWAVE OVEN AND A PREPARATION METHOD THEREOF

TECHNICAL FIELD

The present invention relates to a premix composition of glutinous rice cake for baking in microwave oven and a preparation method thereof, more specifically, to the premix composition of glutinous rice cake capable of cooking only with microwave oven, in which the premix composition of glutinous rice cake is made by the glutinous rice powder as a main component with controlled grain size and minimized starch damage and have a good shape retainability after cooking in microwave oven and can embody the consistency peculiar to glutinous rice cake.

BACKGROUND ART

A rice cake which is a Korean traditional food based on rice, is classified by nonglutinous rice cake and glutinous rice cake, in which glutinous rice can be used to make a various of cake such as Ingeolmi (i.e. glutinous rice cake covered with bean flour), well-nutrished glutinous rice cake etc., because it can be easily digested and be kept with softness for a long time without hardening compared to nonglutinous rice. A traditional production method of rice cake consists of soaking a rice into water and powdering the rice and then putting the rice powder through sieve and steaming the sieved rice powder with steamer and separately preparing a nut or flour for powdering rice cake and thus it is difficult and complicate to make rice cake at home.

Since a structure of glutinous rice starch is constructed with only amylopectin having branched structure, in which various of glucose chain are connected with α-1,4 bonding to glucose chain back bone of α-1,6 bond, glutinous rice cake, different from nonglutinous rice cake, has a tendency to stretch without maintaining shape after heating or reheating prepared rice cake. When glutinous rice cake is prepared at a specialty store or a home, glutinous rice is steamed in a steamer and shaped in hot state and then cut and eaten after getting cold and thus shape retainability of the cooked rice cake is beside of the question. However, because the premix composition of glutinous rice cake of the present invention for baking in microwave oven is for the convenience of a consumer, shape retainability is very important.

With regard to the prior art for rice powder and premix of rice cake, the Published Korean Patent Application No. 2002-0050656 disclosed a method for preparing rice cake in which the rice cake was prepared with rice powder made by soaking a rice in water and grinding and then completely drying, and cereal flour made by steaming and grinding. However, the above invention only relates to the rice powder made by grinding rice and drying and the dried cereal flour, there is still complicate problem that water is added to the rice powder and the cereal flour and then the mixture is steamed in a steamer.

The Published Korean Patent Application No. 2003-0072094 disclosed a premix composition comprising as a main component wheat flour for rice cake or noodles containing resistant starch.

The Published Korean Patent Application No. 2006-0024118 disclosed a quality improving agent for rice cake and a premix of rice powder comprising the same, in which the quality improving agent for rice cake comprises α- and β-denatured starch at ratio of 17:83 to 75:25 and the premix of rice powder comprises 60 to 80 wt % of the dried rice powder and 20 to 40 wt % of the quality improving agent, and the premix is characterized in inhibiting aging as containing the denatured starch compared to that of made by 100% unglutinous rice powder. The premix is for the conventional method for preparing rice cake in which water is added to and mixed with rice powder and the mixture is shaped and steamed.

In addition, the Published Korean Patent Application No. 2007-0007652 disclosed a composition of instant rice cake for baking in microwave oven and method for preparing the same in which a premix of rice cake for baking in microwave oven is prepared by the process of washing unglutinous rice to remove impurities and soaking it into water and going through the steps of dehydrating, grinding, drying, re-grinding and drying and then selecting to the grain size, and using the selected rice powder to make the premix. The above invention disclosed the premix of rice cake for baking in microwave oven, however, the premix has the starch damage of 5 to 10% and use unglutinous rice having grain size of 80 to 200 mesh and it has defects that the rice cake prepared by the premix is maintained only for 2 hours after cooking without using inhibitor of aging and is also impossible to distribute at room temperature due to the possibility of the propagation of microorganism or a change in quality as it has water content of above 25%.

Accordingly, as considering the above facts, the present inventors accomplish the present invention by confirming that a premix composition of glutinous rice cake can be prepared to have a good shape retainability after heating and to maintain softness for 24 hours without adding inhibitor of aging and to distribute for above 6 months at room temperature with glutinous rice of water content of below 15% by using glutinous rice powder having 200 to 400 μm of average grain size and comprising less than 5 wt % of glutinous rice powder of below 200 mesh and 40 to 70 wt % of glutinous rice powder of 200 to 400 mesh.

The present invention is different from the prior arts and have advantages to provide convenience that glutinous rice cake similar to that of available in commercial specialty store can be cooked only by microwave oven at a home by using glutinous rice which has the controlled grain size obtained by grinding via understanding properties of glutinous rice.

DISCLOSURE

Technical Problem

The premix composition of glutinous rice cake for baking in microwave oven according to the present invention is accomplished by the step of soaking the selected glutinous at 25° C. for 2 to 5 hours; firstly grinding the dehydrated glutinous rice of 20 to 40 wt % of water content with roll mill and secondly grinding with pin mill; drying the glutinous rice powder to water content of 15 wt %; fractioning the dried glutinous rice powder to 40 mesh, 60 mesh, 100 mesh, 140 mesh and 200 mesh; considering the quality of the glutinous rice powder such as dissolving property, shape retainability, taste in accordance with each mesh of glutinous rice powder; selecting the optimized ratio; selecting the condition of grinding in order to grind with the selected ratio; adding the denatured starches, sugar and salt to glutinous rice powder made by the selected grinding condition to complete the optimized mixing ratio; considering the quality of glutinous rice cake in accordance with amount of water and cooking time to determine amount of water and cooking time with regard to 120 g of the premix of glutinous rice cake; determining cooking process in order to easily remove the glutinous rice cake from container; preparing the glutinous rice cake by the premix of glutinous rice cake and the cooking process obtained above with the optimized conditions; examining the degree of aging of the prepared glutinous rice cake with keeping it at room temperature and comparing the strength of stability of the glutinous rice cake after warming with microwave oven followed by freezing with that of commercial rice cake.

Accordingly, the object of the present invention is to provide the premix composition of glutinous rice cake capable of cooking only with microwave oven, in which the premix composition of glutinous rice cake is made by the glutinous rice powder as a main component with controlled grain size and minimized starch damage and have a good shape retainability after cooking in microwave oven and can embody the consistency peculiar to glutinous rice cake.

The another object of the present invention is to provide a method for preparing the premix composition of glutinous rice cake capable of cooking only with microwave oven, in which the premix composition of glutinous rice cake is made by the glutinous rice powder as a main component with controlled grain size and minimized starch damage and have a good shape retainability after cooking in microwave oven and can embody the consistency peculiar to glutinous rice cake.

Technical Solution

The present invention provides a premix composition of glutinous rice cake for baking in microwave oven and a preparation method thereof.

More specifically, the present invention is to a glutinous rice cake premix product which can be baked into rice cake by mixing with water and baking in microwave oven, and which is characterized in using glutinous rice powder obtaining by controlling grain size and minimizing starch damage. By using the glutinous rice powder as a main constituent, the present invention provides a glutinous rice cake premix composition and a preparation method thereof which have a good shape retainability and can be embodied chewing taste peculiar to glutinous rice cake after baking in microwave oven.

The present invention provides a glutinous rice powder for baking in microwave oven having 200 to 400 μm of average grain size and comprising 5 wt % of less than 200 mesh of glutinous rice powder and 40 to 70 wt % of 40 to 100 mesh of glutinous rice powder.

The present invention provides a premix composition of glutinous rice cake for baking in microwave oven comprising the glutinous rice powder.

In the present invention, the premix composition of glutinous rice cake for baking in microwave oven is characterized in comprising 60 to 110 weight parts of glutinous rice powder, 5 to 20 weight part of acetic acid glutinous rice starch, phosphoric acid cross-linked glutinous rice starch, 0.2 to 3 weight part of salt and 5 to 20 weight part of sugar.

In the present invention, the premix composition of glutinous rice cake for baking in microwave oven is characterized in further comprising one or more cereal powder selected from the group consisting of black rice flour, pumpkin flour, unpolished rice flour and barley flour.

The present invention also provides a premix product of glutinous rice cake for baking in microwave oven comprising the premix composition of glutinous rice cake according to claim 2, nuts or cereal flour and sesame oil in container with cover capable of using in microwave oven.

The present invention also provides a method for preparing glutinous rice cake for cooking with microwave oven comprising adding 100 to 140 weight part of the premix composition of glutinous rice cake according to claim 2 and 120 to 150 weight part of water to container for microwave oven to mix, and cooking for 3.5 to 4.5 minutes based on 700 W in microwave oven. In the method of the present invention, sesame oil can be put on interior of the container or one or two drop of sesame oil can be added to premix composition of glutinous rice cake before cooking in microwave oven in order to easily remove glutinous rice cake from the container.

In the follows, more specific constructions of the present invention will be explained.

In the present invention, by washing, soaking and dehydrating selected glutinous rices, and firstly pulverizing the dehydrated rice with roll mill following by secondly pulverizing with pin mill, and drying to average grain size of 200 to 400 μm and controlling the grain size to comprise 5 wt % of less than 200 mesh of glutinous rice powder and 40 to 70 wt % of 40 to 100 mesh of glutinous rice powder, and making starch damage to blow 5 wt %, it can be prepared glutinous rice powder that can produce glutinous rice cake having a good shape retainability after baking in microwave oven and soft and chewing taste without hardening after leaving for 24 hours at room temperature differently from the conventional glutinous rice cake difficult in forming a shape as baking, The present invention can provide premix product of glutinous rice cake which can be produced by putting premix of glutinous rice cake comprising the glutinous rice powder prepared in above into container capable of baking in microwave oven, and therefore the present invention can provide rice cake which can be easily made by microwave oven without special preparation at home, and can also provide premix product of glutinous rice cake capable of exportation with extended expiration date as well as domestic consumption because it is a dry powdered product having less than 15% of water content.

The premix product of glutinous rice cake can further comprise cereal flour, nuts, raisins, retort black beans or retort peas etc.

The cereal flour comprises bean flour, coconut flour, black sesame flour etc., the nuts comprises a walnut, pumpkin seed, sunflower seed, a peanut etc.

The process of pulverizing rice powder, the process of preparing premix of rice cake and the process of baking are shown in FIGS. 1, 2 and 3, respectively.

Advantageous Effects

The present invention have effect to provide premix composition of glutinous rice cake for baking in microwave oven capable of easily preparing into glutinous rice cake at home which have a good shape retainability and chewing taste as baking in microwave oven as well as a taste like fresh made rice cake without hardening after leaving for a long time after baking and without deforming as reheating followed by freezing

BEST MODE

Figure 1:
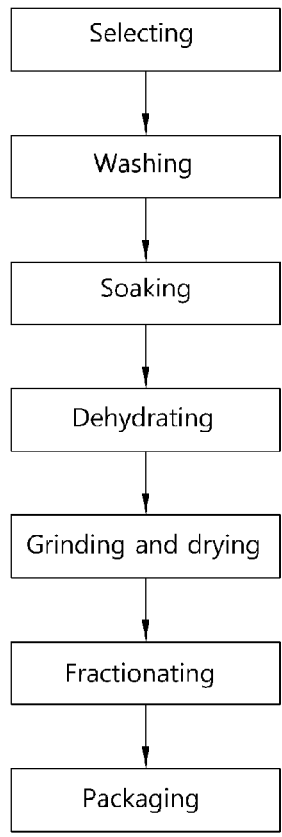
FIG. 1 is a schematic flowing diagram showing the method for preparing glutinous rice powder according to the present invention.
Figure 2:
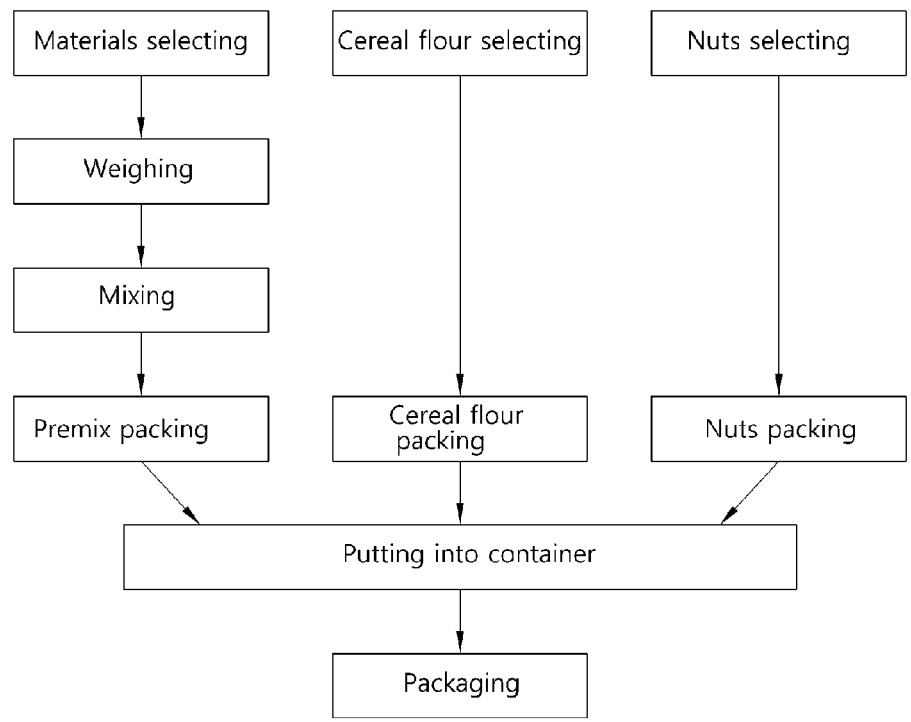
FIG. 2 is a schematic flowing diagram showing the method for preparing the composition of glutinous rice cake powder for cooking with microwave oven according to the present invention.

In the followings, the present invention is more detailed described with reference to example and experimental example. However, the present invention is only exemplified by those examples and a range of the present invention can not be restricted by those examples.

Example 1

Investigation for Quality Properties of Glutinous Rice Cake According to Size Selected glutinous rice was soaked into water of 25° C. for 2 to 5 hours and dehydrated to water content of 20 to 40 wt %. The dehydrated glutinous rice powder was pulverized firstly with roll mill and secondly with pin mill and dried and then sieved through standard sieve of 40 mesh, 60 mesh, 100 mesh, 140 mesh, 200 mesh to make glutinous rice powders with classified grain size.

The obtained glutinous rice powders were fractioned and glutinous rice cake was prepared with each fraction. Then, quality properties of glutinous rice cake was investigated and the result was shown in Table 1. The estimation was carried out with glutinous rice cake prepared by the method that 100 weight part of each size of glutinous rice powder was added to 130 weight part of water and dissolved completely, and then the mixture was put into container for microwave oven equipped with cover and baking in 700 W microwave oven for 4 minutes.

TABLE 1

| Size | Dissolving property | Shape retainability | Taste |
|---|---|---|---|
| 40 mesh~60 mesh | excellent | good | no consistency and broken with snaps |
| 60 mesh~100 mesh | excellent | good | little consistency and still broken with snaps |
| 100 mesh~140 mesh | not bad | good | good consistency |
| 140 mesh~200 mesh | bad | bad | good consistency |
| 200 mesh or below | extremely bad | extremely bad | excellent consistency |

As shown in the result of table 1, it can be seen that the glutinous rice powder was less dissolved on stirring in water and was less retained with shape as smaller the grain size. It is considered that such appearance is occurred as smaller grain size, bigger surface area and starch damage.

However, with regard to taste, it can be seen that there was no consistency and was feeling broken with snaps as grain size is bigger, and there was chewing taste and was good consistency as grain size is smaller.

With such results, in order to obtain both of shape retainability and taste, it should be used premix which is mixture of all fractions.

Therefore, in order to recognize the optimized ratio in accordance with each grain size, experiment was designed via the mixture experiment method of Minitab program and shape retainability and degree of consistency was expressed with 5 points estimation when rice cake was prepared with the obtained data, and then finally optimized ratio was selected. The results was shown in the following Table 2.

In order to ensure the optimized quality of rice cake by obtaining above 4 points in both of the shape retainability and consistency, glutinous rice powder should be have 200 to 400 μm of average grain size and consist of less than 5 wt % of below 200 mesh glutinous rice powder and above 40 wt % of 40 to 100 mesh glutinous rice powder.

TABLE 2

| Number of experiment | Grain size | | | | | Functional test | |
|---|---|---|---|---|---|---|---|
| | 40 mesh~60 mesh | 60 mesh~100 mesh | 100 mesh~140 mesh | 140 mesh~200 mesh | 200 mesh or below | Shape retainability | Consistency |
| 1 | 0.4 | 0.1 | 0.1 | 0.4 | 0 | 5 | 4.5 |
| 2 | 0.4 | 0.1 | 0.1 | 0.25 | 0.15 | 1.5 | 2 |
| 3 | 0.1 | 0.4 | 0.1 | 0.4 | 0 | 4 | 4 |
| 4 | 0.1 | 0.1 | 0.4 | 0.4 | 0 | 3 | 4 |
| 5 | 0.1 | 0.25 | 0.1 | 0.4 | 0.15 | 1 | 4 |
| 6 | 0.4 | 0.4 | 0.1 | 0.1 | 0 | 5 | 3 |
| 7 | 0.4 | 0.25 | 0.1 | 0.1 | 0.15 | 1.5 | 3 |
| 8 | 0.25 | 0.1 | 0.4 | 0.1 | 0.15 | 1 | 3 |
| 9 | 0.4 | 0.1 | 0.25 | 0.1 | 0.15 | 1.5 | 3 |
| 10 | 0.1 | 0.4 | 0.4 | 0.1 | 0 | 4 | 2 |
| 11 | 0.225 | 0.225 | 0.225 | 0.225 | 0.1 | 3 | 3 |
| 12 | 0.3125 | 0.1625 | 0.1625 | 0.3125 | 0.05 | 3.5 | 4 |
| 13 | 0.3125 | 0.3125 | 0.1625 | 0.1625 | 0.05 | 4 | 4 |
| 14 | 0.1625 | 0.1625 | 0.3125 | 0.2375 | 0.125 | 1 | 3.5 |
| 15 | 0.2375 | 0.1625 | 0.1625 | 0.3125 | 0.125 | 2 | 3.5 |
| 16 | 0.1625 | 0.1625 | 0.2375 | 0.3125 | 0.125 | 1 | 3 |
| 17 | 0.3125 | 0.3125 | 0.1625 | 0.1625 | 0.05 | 4 | 4 |
| 18 | 0.2375 | 0.3125 | 0.1625 | 0.1625 | 0.125 | 3 | 3 |
| 19 | 0.2375 | 0.1625 | 0.3125 | 0.1625 | 0.125 | 2 | 3.5 |

Example 2

Test to Quality of Premix of Glutinous Rice Cake in Accordance with Mixing Ratio In order to increase anti-aging effect and strength of stability after freezing, to glutinous rice powder prepared in example 1, acetic acid glutinous rice starch and phosphoric acid crosslinking glutinous rice starch, sugar, and salt were added with different amount to make premix of glutinous rice cake with the optimized mixing ratio as shown in Table 3. Then the quality of rice cake was estimated. In the state of fixing the amount of sugar and salt to 8.5 and 1.5, respectively, the quality change was observed in accordance with the change of the amount of glutinous rice powder and two of denatured starch.

TABLE 3

| Materials | \multicolumn{7}{c}{Mixing ratio of premix of glutinous rice cake(weight part)} | | | | | | |
|---|---|---|---|---|---|---|---|
| | 1 | 2 | 3 | 4 | 5 | 6 | 7 |
| fine sugar(sugar) | 8.5 | 8.5 | 8.5 | 8.5 | 8.5 | 8.5 | 8.5 |
| glutinous rice powder | 70 | 80 | 80 | 90 | 90 | 90 | 110 |
| acetic acid glutinous rice starch | 20 | 20 | 10 | 20 | 0 | 10 | 0 |
| phosphoric acid crosslinking glutinous rice starch | 20 | 10 | 20 | 0 | 20 | 10 | 0 |
| salt | 1.5 | 1.5 | 1.5 | 1.5 | 1.5 | 1.5 | 1.5 |
| total | 120.0 | 120.0 | 120.0 | 120.0 | 120.0 | 120.0 | 120.0 |

The result of comparison test to quality in accordance with the mixing ratio of premix of glutinous rice cake was shown in table 4.

The tested glutinous rice cake was prepared by the method that each materials were mixed with mixer in accordance with the mixing ratio of table 3 and 120 weight part of the premix of glutinous rice cake was added to 130 weight part of water and dissolved completely, and then the mixture was put into container for microwave oven equipped with cover and baking in 700 W microwave oven for 4 minutes.

TABLE 4

| Mixing ratio | Viscosity | General taste (5 points scale) | Remark |
|---|---|---|---|
| comparison example 1 | thin | 3 | much of starch taste. not hardened after getting cold |
| comparison example 2 | thin | 3.5 | deficiency of texture. good taste after getting cold |
| comparison example 3 | thin | 3.5 | deficiency of texture. good taste after getting cold |
| comparison example 4 | moderate | 3.5 | deficiency of texture |
| comparison example 5 | moderate | 3.2 | toughened as time passes |
| comparison example 6 | moderate | 4.3 | consistent in the hot state. not hardened after storing for a long time |
| comparison example 7 | slightly thick | 4.1 | feeling of broken with snaps in the hot state, but very consistent after getting cold |

As shown in Table 4, it was demonstrated that acetic acid glutinous rice starch inhibited the aging of rice cake and phosphoric acid crosslinking glutinous rice starch endowed consistent taste. However, when the amount of the two starches were over 30 g, glutinous rice cake was tasted peculiar to starch without taste of glutinous rice cake. Therefore, the amount of the two starches should be below 30 g. Especially, when the amount of phosphoric acid crosslinking glutinous rice starch was excess, glutinous rice cake was being tough as time passes.

Consequently, the optimized taste was obtained when glutinous rice cake comprised 10 weight part of acetic acid glutinous rice starch, 10 weight part of phosphoric acid crosslinking glutinous rice starch, 8.5 weight part of sugar and 1.5 weight part of salt based on 90 weight part of glutinous rice powder.

Example 3

Test to Quality of Premix of Glutinous Rice Cake in Accordance with the Amount of Water In order to determine the amount of water, glutinous rice cake was prepared by adding water varied in amount of 100 to 160 g to both premix of example 2 and comparison example 6, and the quality of rice cake was analyzed.

As a result, when 130 g of water was added, the premix was well dissolved in the water and the prepared rice cake had good quality immediately after and as time passes from baking with microwave oven. However, when the amount of water was below 130 g, the premix was bad dissolved in the water and the prepared rice cake was easily hardened at the edge, and when the amount of water was over 130 g, the prepared rice cake was tasted gooey no texture in mouth.

Therefore, as the quality of rice cake was changed with amount of water, it was confirmed that the amount of water should be controlled within 100 to 160 g in accordance with the amount of premix of rice cake and the kind of other cereal flour.

Example 4

Test to Quality of Premix of Glutinous Rice Cake in Accordance with the Baking Time In order to optimize baking time, glutinous rice cake was baked with conditions of example 3 for 3 to 6 minutes in 700 W microwave oven and baking properties and quality of rice cake was estimated.

As a result, the optimized baking time was 3.5 to 4.5 minutes. In time of below 3.5 minutes, the rice cake did not cook, and in time of over 4.5 minutes, the edge of rice cake was dried and scorched.

Example 5

Test to Quality of Premix of Glutinous Rice Cake in Accordance with the Aging In order to observe the status of aging of rice cake as time passes, rice cake was prepared in accordance with the mixing ratio of example 2 and comparison examples 6 and 7. and the water content and the functional test for the prepared rice cake was performed during 24 hours with keeping by covering with wrap.

As a result, the rice cake was maintained its softness until 24 hours. In addition, in case of using the denatured starch, consistent in warm state was better, but after 30 minutes, rice cakes made by both of the mixing ratio were became consistent and could be maintained consistency and softness for 24 hours.

Example 6

Test to Strength of Stability of Glutinous Rice Cake

The rice cakes were made according to the mixing ratio of example 2 and comparison example 6. The rice cakes were frozen and then were heated in microwave oven for 3 minutes to restore its shape. The shape retainability of the rice cakes were compared to commercial rice cake.

As a result, the rice cake of the present invention was maintained its shape, however, commercial rice cake was easily lose its shape.

Example 7

Investigation of Separability of Glutinous Rice Cake from Container after Baking in Accordance with Cooking Processes In the present example, the glutinous rice cake was cooked with various cooking method and then the simplest method was selected which is capable of easily separating the glutinous rice cake from container after cooking.

The glutinous rice cake can be easily separated from container as using paste of the glutinous rice powder which was kneaded by hands with sesame oil in separate container. However, in this case, there is an intricacy that sesame oil should be applied in the state of putting on vinyl globes. With other easier means, it is possible to easily separate the glutinous rice cake without applying sesame oil on the palm of hands from container due to remaining oil at the bottom of container when the glutinous rice powder was kneaded with water after adding sesame oil into container.

Example 8

Investigation for Diversifying the Premix of Glutinous Rice Cake for Baking in Microwave Oven In the present example, the glutinous rice cake can be prepared with various mixing ratio for diversifying the premix of glutinous rice cake for baking in microwave oven. That is, mugwort Ingeolmi, black bean Ingeolmi, bean well-nutrished glutinous rice cake, black bean well-nutrished glutinous rice cake, pumpkin well-nutrished glutinous rice cake, black sesame well-nutrished glutinous rice cake, unpolished barley well-nutrished glutinous rice cake can be prepared with the glutinous rice powder according to the present invention.

Various mixing ratio of the glutinous rice cake was shown in table 5.

TABLE 5

| | Various mixing ratio of the glutinous rice cake (weight part) | | | | | | | |
|---|---|---|---|---|---|---|---|---|
| materials | class of Ingeolmi | | | class of well-nutrished glutinous rice cake | | | | |
| materials | Ingeolmi | mugwort | black rice | bean | black rice | pumpkin | black sesame | unpolished barley |
| fine sugar | 8.5 | 8.5 | 15 | 15 | 10 | 10 | 10 | 10 |
| glutinous rice powder | 100 | 95 | 90 | 100 | 90 | 85 | 100 | 85 |
| black rice powder | — | — | 10 | — | 10 | — | — | — |
| pumpkin powder | — | — | — | — | — | 10 | — | — |
| mugwort powder | — | 5 | — | — | — | — | — | — |
| unpolished rice powder | — | — | — | — | — | — | — | 5 |
| barley powder | — | — | — | — | — | — | — | 5 |
| acetic acid glutinous rice powder | 10 | 10 | 10 | 10 | 10 | 10 | 10 | 10 |
| phosphoric acid crosslinking glutinous rice powder | 10 | 10 | 10 | 10 | 10 | 10 | 10 | 10 |
| salt | 1.5 | 1.5 | 1.5 | 1.5 | 1.5 | 1.5 | 1.5 | 1.5 |
| total | 130 | 130 | 136.5 | 136.5 | 131.5 | 126.5 | 131.5 | 126.5 |

Example 9

Figure 3:
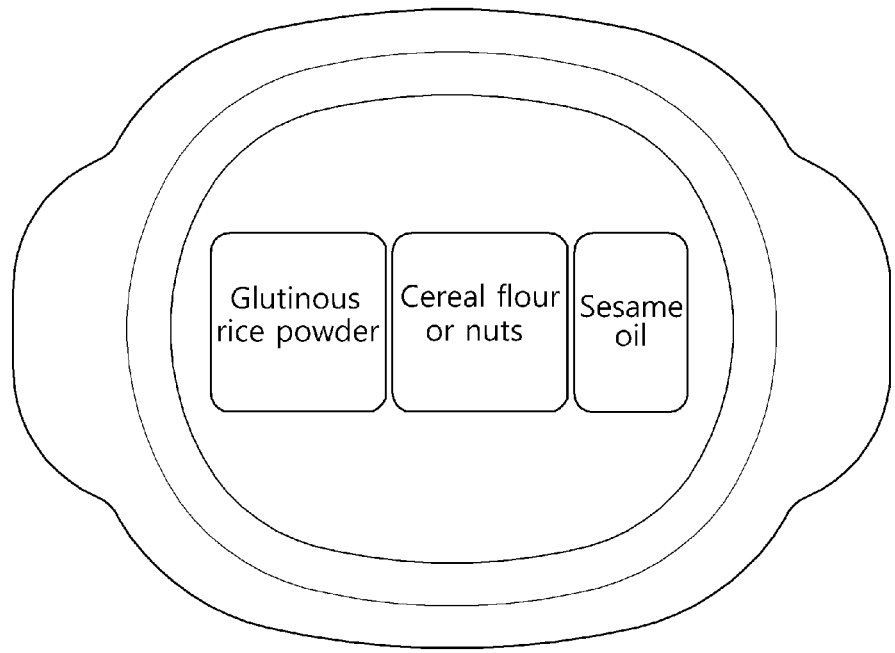
FIG. 3 is showing a type of product of cake premix for microwave oven according to the present invention.
Figure 4:
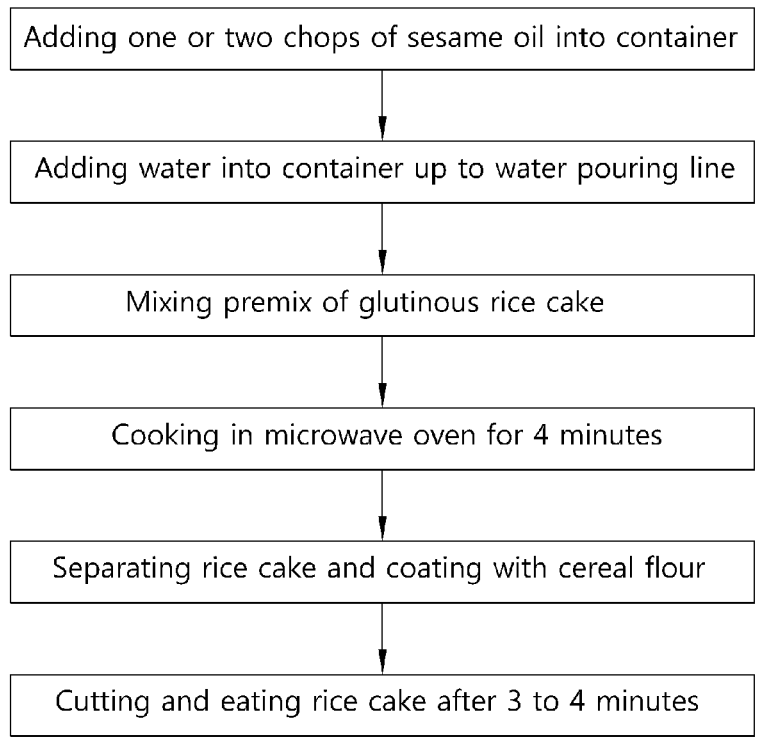
FIG. 4 is a schematic flowing diagram showing the method for preparing cake premix for microwave range according to the present invention.

Preparation of Product Using Premix Composition of Glutinous Rice Cake of the Present Invention A product for homemade rice cake was produced by putting a premix composition of glutinous rice cake and each of cereal flour, nuts, raisins, retort black beans or retort peas into container equipped with cover capable of using in microwave oven. A type of product and cooking process was shown in FIGS. 3 and 4 respectively.

Firstly, the glutinous rice cake premix was taken out of the glutinous rice cake premix product made use of glutinous rice powder of the present invention and then 1 to 5 drops of sesame oil separately enclosed in container was dropped into the container. Water was added up to a water pouring line of container (which is determined by the ratio of 130 weight parts to 100 weight parts of glutinous rice powder) and then the glutinous rice cake premix was mixed into water with stirring till no lumps. The container was cooked in 700 W microwave oven for about 4 minutes to easily prepare rice cake having a good shape retainability and chewying taste.

Moreover, the prepared rice cake can be eaten with cereal flour or nuts to one's taste.

The glutinous rice cake made by premix product of glutinous rice cake of the present invention, cannot be hardened after leaving for a long time and can be taste like as a steaming rice cake without deforming.

INDUSTRIAL APPLICABILITY

As disclosed in the above examples, the present invention relates glutinous rice cake premix product capable of cooking into cake only with microwave range, which is characterizing in using glutinous rice powder made by controlling grain size and minimizing starch damage. Therefore, the present invention has excellent effect on providing the premix composition of glutinous rice cake which have a good shape retainability and can embody chewy taste peculiar to glutinous rice cake by using glutinous rice powder after heating with microwave range, and on providing method for preparing the same such that the present invention is very useful to food industry.

The invention claimed is:

1. A glutinous rice cake premix composition for cooking in a microwave oven, consisting of:

60 to 110 parts by weight of glutinous rice powder, 5 to 20 parts by weight of acetic acid glutinous rice starch, 5 to 20 parts by weight of phosphoric acid cross-linked glutinous rice starch, 0.2 to 3 parts by weight of salt and 5 to 20 parts by weight of sugar, wherein the glutinous rice powder having an average grain size of 200-400 µm, having less than 15% water content and comprising less than 5 wt. % of glutinous rice powder of 200 mesh and 40 to 70 wt. % of glutinous rice powder of 40 to 100 mesh, wherein the amounts of acetic acid glutinous rice starch and phosphoric acid cross-linked glutinous rice starch do not exceed 30 parts by weight;

optionally, nuts selected from the group consisting of a walnut, pumpkin seed, sunflower seed, and a peanut;

optionally, cereal flour selected from the group consisting of bean flour coconut flour, and black sesame flour; and optionally, sesame oil.

2. A glutinous rice cake premix composition for cooking in a microwave oven, consisting of:

60 to 110 parts by of glutinous rice powder, 5 to 20 parts by weight of acetic acid glutinous rice starch, 5 to 20 parts by weight of phosphoric acid cross-linked glutinous rice starch, 0.2 to 3 parts by weight of salt, 5 to 20 parts by weight of sugar, and nuts or one or more cereal powder selected from the group consisting of unpolished rice flour and barley flour, wherein the glutinous rice powder having an average grain size of 200-400 µm, having less than 15% water content and comprising less than 5 wt % of glutinous rice powder of 200 mesh and 40 to 70 wt % of glutinous rice powder of 40 to 100 mesh, wherein the amounts of acetic acid glutinous rice starch and phosphoric acid cross-linked glutinous rice starch do not exceed 30 parts by weight.

3. A method for preparing a glutinous rice cake for cooking in a microwave oven, comprising adding 100 to 140 parts by weight of the glutinous rice cake premix composition according to claim 1 to 120 to 150 parts by weight of water to obtain a mixture, and cooking the mixture in a 700W microwave for 3.5 to 4.5 minutes.

4. The glutinous rice cake premix composition according to claim 1, consisting of: 90 parts by weight of glutinous rice powder, 10 parts by weight of acetic acid glutinous rice starch, 10 parts by weight of phosphoric acid cross-linked glutinous rice starch, 1.5 parts by weight of salt and 8.5 parts by weight of sugar.

5. A method for preparing a glutinous rice cake for a microwave oven, comprising adding 100 to 140 parts by weight of the glutinous rice cake premix composition according to claim 4 to 120 to 150 parts by weight of water to obtain a mixture, and cooking the mixture in a 700W microwave oven for 3.5 to 4.5 minutes.

* * * * *